July 20, 1926.

J. H. DORAN 1,593,393

ELASTIC FLUID TURBINE AND THE LIKE

Filed Oct. 30, 1923

Inventor:
John H. Doran,
by Alexander S. ____
His Attorney.

Patented July 20, 1926.

1,593,393

UNITED STATES PATENT OFFICE.

JOHN H. DORAN, OF SCHENECTADY, NEW YORK, ASSIGNOR TO GENERAL ELECTRIC COMPANY, A CORPORATION OF NEW YORK.

ELASTIC-FLUID TURBINE AND THE LIKE.

Application filed October 30, 1923. Serial No. 671,765.

The present invention relates to elastic-fluid turbines and the like and particularly to turbines of the type comprising a plurality of disks or wheels mounted on a shaft and carrying suitable buckets on their peripheries.

The object of the present invention is to provide an improved arrangement in elastic-fluid turbine-rotors for attaching the wheels or disks to the shaft, and for a consideration of what is believed to be novel and the invention, attention is directed to the accompanying drawing, description thereof and the appended claims.

Figure 1:
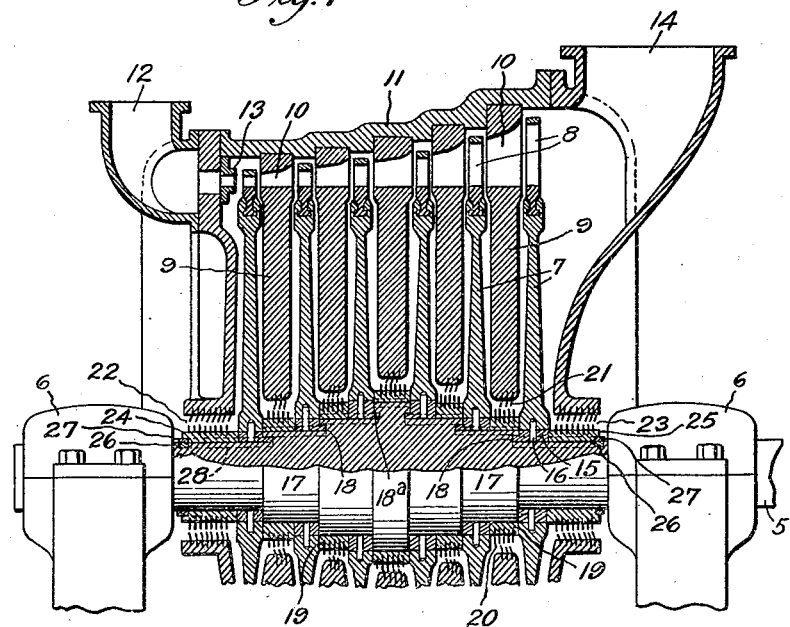
Figure 2:
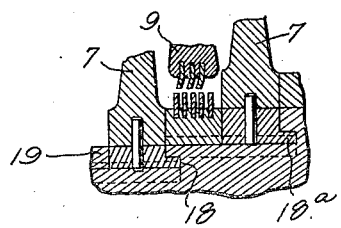

In the drawing, Fig. 1 is a longitudinal, sectional view of an elastic-fluid turbine embodying the invention, and Fig. 2 is a longitudinal sectional view on an enlarged scale of a portion of Fig. 1.

Referring to the drawing, 5 is the turbine shaft mounted in bearings 6 and carrying a series of bucket wheels 7, on the peripheries of which are mounted rings of radial buckets 8. Interposed between the bucket wheels are diaphragms 9 which divide the wheels into a series of successive stages. These diaphragms are provided with annular rings of nozzles 10, in alignment with the bucket rings for receiving and directing elastic fluid from one stage to another.

The turbine casing in which the diaphragms are mounted is indicated at 11. This is provided with an inlet opening 12, an inlet nozzle section 13 and an exhaust opening 14. The structure shown and thus far described may be taken as an example of the usual type of elastic fluid turbine.

In the present example, my invention is shown as being carried out in connection with a wheel structure wherein the wheels are mounted on rings 15 from which they may expand under guidance of radial pins 16 which project into them from the rings. These pins are equally spaced about the ring and maintain the wheels concentric with the rings as the wheels expand under action of temperature and centrifugal stresses. A wheel with its carrying ring attached forms in substance a unitary wheel structure adapted to be attached to and removed from a shaft as a unit.

According to my invention the wheel structures are secured to the shaft on a series of stepped diameters 17 which are formed by reducing the diameter of the shaft from a section between its ends progressively toward either or both ends in a series of steps. Each radial face or shoulder, formed between the steps, is undercut to provide an annular recess 18 into which is fitted a corresponding annular projection 18$^a$ at the bore of the wheel structure. The projection 18$^a$ fitting within a recess 18 in the shaft, serves to hold the wheel structure concentric with the shaft against radial stresses tending to separate it from the shaft. With the particular wheel structure illustrated, projections 18$^a$ are parts of the rings 15.

Between rings 15, spacing rings 19 are pressed or otherwise fitted onto the shaft. These may be integral with rings 15, although in the present example they are shown as separate therefrom. Spacing rings 19 carry the usual interstage packing members 20. Cooperating stationary packing members carried by the diaphragms are indicated at 21. The shaft ends are packed at each end of the shell by similar packings 22 and 23 carried jointly by the shell and rings 24 and 25 pressed onto the shaft. These rings are similar to spacing rings 19 and are each secured on the shaft by a pair of locking rings 26 and 27. Ring 26 is a split ring snapped into a groove in the shaft with ring 27 forced over it. These form substantially a key at each end of the shaft for holding the assembled units from longitudinal movement. The spacing rings 19 and the wheel-carrying rings 15 are keyed to the shaft after the manner of all rotating parts fitted to a shaft. The keys are indicated by dotted lines 28.

In assembling the wheels on a shaft, they are put on successively from opposite ends of the shaft, the arrangement being such that a reasonably tight fit of the wheel on the shaft is obtained. This may be accomplished by shrinking the wheels on in the well-understood manner. However, since the projections 18$^a$ fitting into recesses 18 serve to hold the wheel structures concentric with the shaft, the wheel structures need not be put on with a very tight shrink-fit as would otherwise be the case. This has the great advantage that it facilitates assembly and disassembly and particularly the latter for it is often very difficult to remove from a shaft, wheels which are very tightly shrunk on it.

While my invention is well adapted for use with wheel structures wherein the wheels are attached to the shaft through the intermediary of a ring, such as the rings 15, it will be understood of course that it is not limited thereto but may be used in connection with any desired type of wheel structure.

Any required number of wheels may be secured to the shaft in this manner by providing a corresponding number of shoulders and adjacent cylindrical sections for receiving them.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. In combination, a shaft having a series of radial shoulders along its length formed by reducing its diameter in a series of steps, annular longitudinally extending recesses in said shoulders, wheel units fitted on said shaft and annular projections integral with said wheel units projecting into the annular recesses and forming therewith a means for locking the wheel units on the shaft.

2. In an elastic-fluid turbine or the like, the combination with a rotor having a series of spaced wheel units carried by a common shaft, of means formed in the shaft and on the wheel units engaging to jointly provide an interlocked structure resistant to relative radial movement between the wheel units and the shaft.

3. In an elastic-fluid turbine or the like, the combination with a rotor having a series of spaced wheel units carried by a common shaft, of a corresponding series of shoulders formed in the shaft, a longitudinally-extending annular recess in each of said shoulders, and corresponding annular projections integral with said wheel units fitting into said recesses to form an interlocked structure.

4. In an elastic-fluid turbine, the combination of a shaft having radial shoulders formed along its length between cylindrical sections of differing diameters arranged in a series of graded steps, an annular recess extending longitudinally of the shaft provided in each of said shoulders, a wheel unit on each cylindrical section of the shaft in abutting relation with an adjacent shoulder and means integral with each wheel unit engaging with an adjacent recess to provide a locking means between each wheel unit and the shaft.

5. In an elastic-fluid turbine, the combination of a shaft having an even number of radial shoulders interposed between an odd number of cylindrical sections of decreasing diameter, one with respect to the other toward each end of the shaft, a longitudinally extending annular recess in each shoulder, a wheel unit on each cylindrical section of the shaft, an annular projection integral with each wheel unit fitting into an adjacent annular recess, spacing means between the wheel units, and a locking means adjacent each end of the shaft preventing longitudinal movement of said wheel units.

6. In an elastic-fluid turbine or the like, the combination with a rotor shaft, of a wheel unit thereon, and means for holding the wheel unit concentric with the shaft, comprising an annular longitudinally extending recess in the shaft and a corresponding annular longitudinally extending projection on the wheel unit engaging with the recess.

7. In an elastic-fluid turbine or the like, the combination with a rotor shaft, of a wheel unit thereon, means forming a radial shoulder on the shaft against which shoulder the wheel unit is seated, an annular longitudinally extending recess in the shoulder and a corresponding annular longitudinally extending projection on the wheel unit engaging therewith, said projection and recess providing an interlocking means for maintaining the wheel unit concentric with the shaft.

In witness whereof, I have hereunto set my hand this 29th day of October, 1923.

JOHN H. DORAN.